United States Patent [19]
Cameron et al.

[11] 3,979,493
[45] Sept. 7, 1976

[54] METHOD FOR PRODUCING GLASS FIBER REINFORCING MEMBERS

[75] Inventors: Neil McIver Cameron, Southport; Kenneth Cyril Thatcher, Billinge; Frederick Paul Mallinder, Southport, all of England

[73] Assignee: Fibreglass Limited, St. Helens, England

[22] Filed: Aug. 15, 1974

[21] Appl. No.: 497,756

[30] Foreign Application Priority Data
Jan. 7, 1974   United Kingdom.................. 649/74

[52] U.S. Cl. ................ 264/145; 264/134; 264/137; 264/160; 264/327
[51] Int. Cl.² ........................................ B29G 7/00
[58] Field of Search .......... 264/134, 136, 137, 327, 264/145, 146, 160

[56] References Cited
UNITED STATES PATENTS

| | | | |
|---|---|---|---|
| 1,467,761 | 9/1923 | Jones | 264/327 X |
| 2,626,429 | 1/1953 | Merrill | 264/137 |
| 2,677,067 | 4/1954 | Johnson | 264/134 X |
| 2,779,388 | 1/1957 | Quoss | 264/137 X |
| 3,372,403 | 3/1968 | Getchell | 38/144 X |

*Primary Examiner*—Richard R. Kucia
*Attorney, Agent, or Firm*—Schuyler, Birch, Swindler, McKie & Beckett

[57] ABSTRACT

Glass fiber reinforcing members with at least one end anchorage point are formed from glass fiber rovings impregnated with resin and shaped into a ribbon. The ribbon is surrounded before curing at discrete intervals with castings which, after curing, provide areas which can be formed into anchorage areas.

6 Claims, 7 Drawing Figures

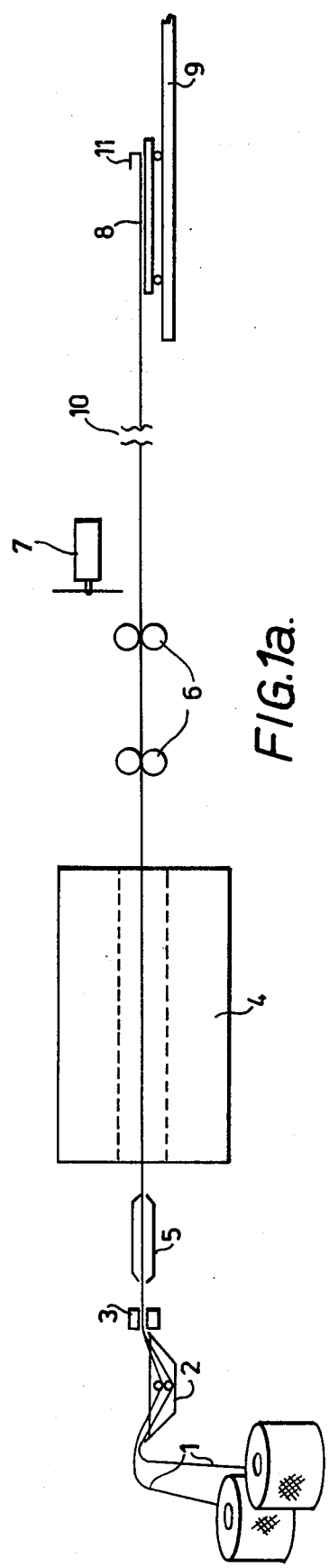
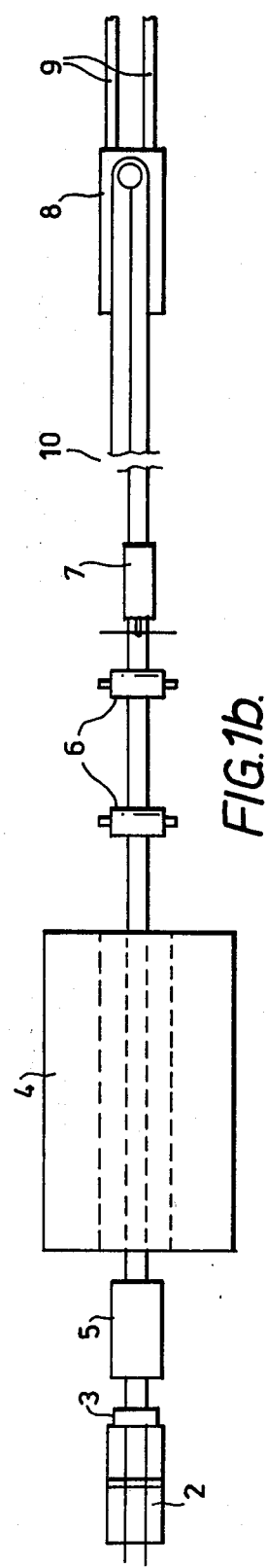
FIG.1a.
FIG.1b.

METHOD FOR PRODUCING GLASS FIBER REINFORCING MEMBERS

This invention relates to a method for the production of reinforcing members made from glass fibre reinforced material.

The reinforcing members or straps produced by the method of the invention are designed for use in the reinforcement of structures which are simply formed from a bank of gravel, earth or like materials and a wall. They can be used e.g. as reinforcing members in reinforcing structures in the manner disclosed in U.K. patent specification No. 1,069,361. In such a use, it is necessary that the reinforcing members be attached to at least one anchoring member, and the present invention is directed to the semicontinuous production of members from glass fibre reinforced material which are provided with anchorage means to co-operate with an anchoring member in forming a reinforced earth structure.

It is well known to form rods of various diameters from a combination of glass fibre strands and polyester resins. Glass fibre rovings in the known process are drawn through a resin impregnating bath, and then through a heated die both to shape and cure the impregnated rovings. Passage through the die also removes entrapped air, excess resin and assists penetration of the resin into the fibre bundles, and imparts a desired diameter to the product. It is also known to pass a length of the impregnated rovings into a split female die, and to cure the length in the die either by dielectric heating, or external heating of the die. Once cured the die is opened, so that the next discrete length can be drawn into the die.

We have now found that by a relatively simple modification of the processes used previously in the manufacture of die-formed glass fibre reinforced plastic rods, we can produce in a continuous manner reinforcing members for use in earth reinforcement. Such members should normally have a length in the range 5 to 30 meters, be about 80 mm wide and have a thickness up to 6 mm. In order to produce such members, it is essential to have a process which can be easily altered to produce reinforcing members of various lengths, as even for one particular structure, the members used are not necessarily all of the same length.

The production of reinforcing members from a combination of glass fibre rovings and thermosetting resins, e.g. a polyester resin, therefore involves the impregnation of the rovings with the resin, and the passage of the impregnated rovings through a die to impart a desired ribbon shape to the impregnated rovings. The material in ribbon form can be continuously cured by passage through a curing oven and subsequently cut into members of convenient length. It is not then possible to simply bore a hole to provide an anchorage point, as this destroys the integrity of the reinforced material.

We have now found that we can produce a ribbon and cure it continuously and at the same time provide areas of the ribbon where anchorages can subsequently be formed after division of the ribbon into the lengths needed to form the members. We carry this out by surrounding the ribbon with a casing along a discrete portion of the ribbon, which can be removed after passage through the curing oven. This means that when the ribbon is cut to form the reinforcing members there are portions which because of the casing are still in a state where they can be shaped to form an anchorage, and then cured to a final form.

According to the invention therefore, there is provided a process for producing glass fibre reinforcing members with an anchorage point at least at one end by continuously passing glass fibre rovings after impregnation in a bath of resinous material through a die to shape the rovings to ribbon form followed by curing of the resin by passage of the ribbon through a curing oven, the ribbon being surrounded before curing at discrete intervals along its length by casings which travel with the ribbon through the curing oven, and provide areas which can subsequently be formed into anchorage areas for the members, the members being cut from the ribbon on leaving the curing oven at intervals determined by the desired length of member to be formed.

In one form of our invention, we provide in a process for the production of reinforcing members in which glass fibre rovings are impregnated with a thermosetting resin, and continuously shaped to ribbon form by passage through a die followed by curing of the resin on passage of the shaped ribbon through a curing oven, the improvement of surrounding the ribbon at intervals before it is cured by means to prevent or inhibit curing in discrete locations, and dividing the ribbon after passage through the oven into straps and subsequently shaping each strap at an uncured portion thereof to provide an anchorage point on the strap.

In using a removeable casing, the selection of the position where the ribbon is divided will determine the final type of reinforcing member produced. If it is simply divided at an uncured portion, the anchorage can be simply formed by splitting the uncured portion along its length, and wrapping the split ends formed around an insert or alternatively a simple former, and then curing. By dividing so as to leave an uncured portion at the centre of a length of the ribbon, a doublemember can be formed by bending the uncured portion around an insert or alternatively a former so that the cured portions are at a convenient angle to one another. An alternative, where there is an uncured portion at the centre of the length of the ribbon, is to bring the two parts into alignment with one another, so as to form what is virtually a single strap.

The means to prevent or inhibit completion of curing along a discrete portion of the ribbon is most conveniently formed by using a pair of rectangular recessed trays which can be clamped together to form a box-like structure surrounding the ribbon. The trays are recessed to prevent direct contact between the surrounded portion of the ribbon and the major flat surfaces of the trays, and thus provide an air space which acts to insulate that portion of the ribbon while passing through the curing oven. The material used to form the trays can be either a metal or a ceramic material.

The production of glass fibre reinforced resins by impregnation and extrusion is a well known process, and there are available resins specially formulated for use in such processes making selection of resin simple for those practised in the art. The curing time is dictated by the nature of the resin used, and again can be easily determined by the man practised in the art.

The strength of the members must be sufficient to accept the maximum working load in a reinforced earth structure with an adequate margin of safety. Such a working load is unlikely to exceed 3 tons.

The process and products of the process will be more fully described with reference to the attached drawings in which:

FIG. 1(a) is a schematic layout of the equipment used in producing the members with a removeable casing to prevent or substantially reduce curing;

FIG. 1(b) is a plan view of the layout of 6(a);

Figure 2A:
Figure 2B:
Figure 2C:
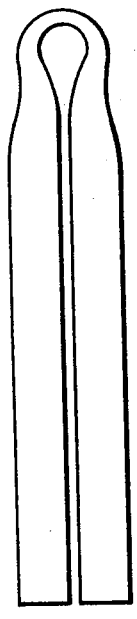
Figure 2D:
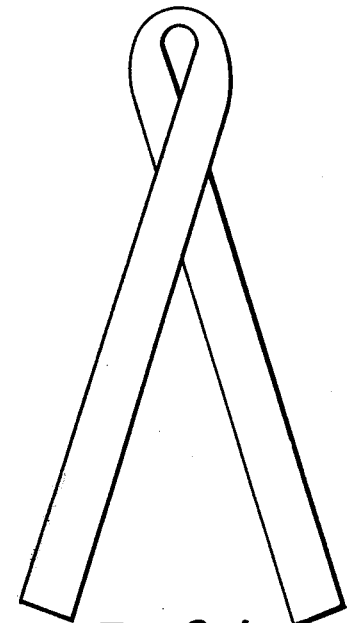
Figure 2E:
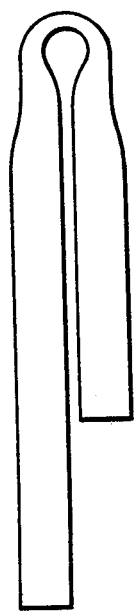

FIG. 2 (a) a member having an insert or thimble insert in the anchorage;

FIG. 2 (b) a member having no thimble or insert in the anchorage; and

FIG. 2 (c), (d) and (e) linked members formed using the equipment shown in FIGS. 1(a) and 1(b).

The form of our invention illustrated by FIGS. 1(a) and 1(b) and will now be described with reference to those figures.

Glass fibres 1 are unwound from cakes and passed into a resin impregnating bath 2, and then through a die 3 to be formed into a ribbon. The shaped ribbon leaves the die 3, and passes to a curing oven 4.

As the ribbon passes to the curing oven, means 5 is placed around the ribbon as a cover to prevent or inhibit curing at the covered area of the ribbon during passage through the curing oven. The ribbon is drawn through the curing oven and the die by means of driven pull wheels 6. On leaving the curing oven, means 5 is removed, and the ribbon may be cut at that point by a cut-off saw 7. The uncured end is split and the split ends either wrapped round a thimble as in FIG. 2(a), or simply shaped round a former to give, after curing, the strap shown in FIG. 2(b). The uncured portion is then cured to give the final form of the reinforcing strap. Alternatively the system shown beyond the broken lines 10 may be used. In this case the ribbon is passed onto a trolley 8 with wheels which run on trolley rails 9, and around an anchorage-forming pin 11, so as to turn back on itself and form a member of the kind shown in FIGS. 2(c), 2(d) or 2(e). The trolley's final position is fixed by the distance from the anchorage to the cut-off point.

What we claim is:

1. In a method for producing glass fiber reinforcing straps with an anchorage point at least at one end comprising continuously passing resin-impregnated glass fiber rovings through a die to shape the rovings into a ribbon, and subsequent curing of the resin on passage of the shaped ribbon through a curing oven, the improvement comprising surrounding the ribbon prior to curing at selected discrete locations along its length by casings which travel with the ribbon through the curing oven, the casings serving to prevent or inhibit curing in said discrete locations so that the ribbon emerges from the oven with cured lengths of ribbon separated from one another by uncured portions, the casings being positioned so as to produce desired lengths of cured ribbon separated by desired lengths of uncured ribbon, cutting the ribbon after it leaves the curing oven to form individual straps having uncured portions between their ends so that a double strap can be formed by bending the strap back on itself at the uncured portion, thus forming an anchorage area for each strap at the uncured portion and then curing the uncured portions while formed as said anchorage area in a curing oven.

2. A method as claimed in claim 1 wherein the ribbon is cut so as to leave an uncured portion at one end which is then split and shaped to form an anchorage area and thereafter cured in a curing oven.

3. A method as claimed in claim 1 wherein the casing is formed from a pair of recessed trays clamped together to form a flat box-like structure surrounding the discrete location of the ribbon.

4. A method of making tension resisting reinforcing straps with integral anchorage loops comprising the steps of:
  a. continuously passing resin impregnated glass fiber rovings through a die to shape the rovings into a ribbon impregnated with resin along its entire length;
  b. attaching hollow, heat resistant casings around the resin impregnated ribbon at optionally selected discrete locations corresponding to the desired spacings of said integral anchorage loops along said straps; the portions of the ribbon between said casings being longer than the segments of the ribbon surrounded by the casings.
  c. continuously passing said resin impregnated ribbon and the attached casings through a curing oven to fully cure the portions of the resin impregnated ribbon between the casings while the segments of the resin impregnated ribbon surrounded by the casings remain at least partially uncured.
  d. removing the casings from the ribbon after passage of the ribbon and casings through the curing oven;
  e. cutting the ribbon at uncured segments into lengths corresponding to the desired lengths of the reinforcing straps;
  f. forming the uncured segments of the straps into anchorage loops, and
  g. thereafter heating the uncured resin impregnated segments while formed as anchorage loops in a curing oven to fully cure the anchorage loops.

5. A method as recited in claim 4 wherein said hollow, heat resistant casings comprise pairs of recessed trays clamped together to form box-like structures surrounding segments of the resin impregnated ribbon; said trays being recessed internally to provide an air space around the ribbon and prevent direct contact between the major flat surfaces of the trays and the surrounded segments of the resin impregnated ribbon.

6. A method of making tension resisting reinforcing straps with integral anchorage loops comprising the steps of:
  a. continuously passing resin impregnated glass fiber rovings through a die to shape the rovings into a ribbon impregnated with resin along its entire length;
  b. attaching hollow, heat resistant casings around the resin impregnated ribbon at optionally selected discrete locations corresponding to the desired spacings of said integral anchorage loops along said straps; the portions of the ribbon between said casings being longer than the segments of the ribbon surrounded by the casings;
  c. continuously passing said resin impregnated ribbon and the attached casings through a curing oven to fully cure the portions of the resin impregnated ribbon between the casings while the segments of the resin impregnated ribbon surrounded by the casings remain at least partially uncured.
  d. removing the casings from the ribbon after passage of the ribbon and casings through the curing oven;
  e. cutting the ribbon into lengths corresponding to the desired lengths of the reinforcing straps;
  f. forming the uncured segments of the straps into anchorage loops; and
  g. thereafter heating the uncured resin impregnated segments while formed as anchorage loops in a curing oven to fully cure the anchorage loops.

* * * * *